UNITED STATES PATENT OFFICE.

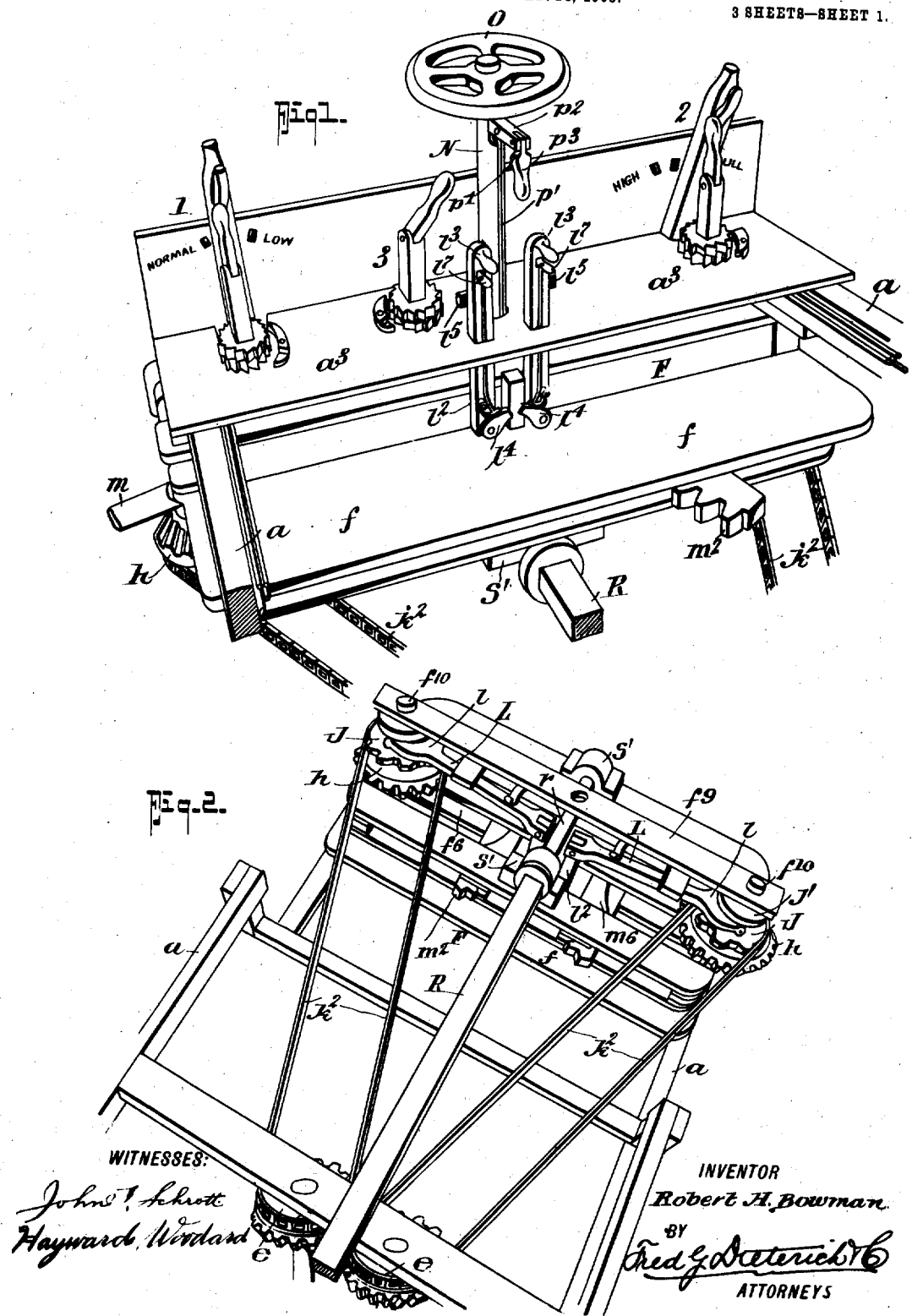

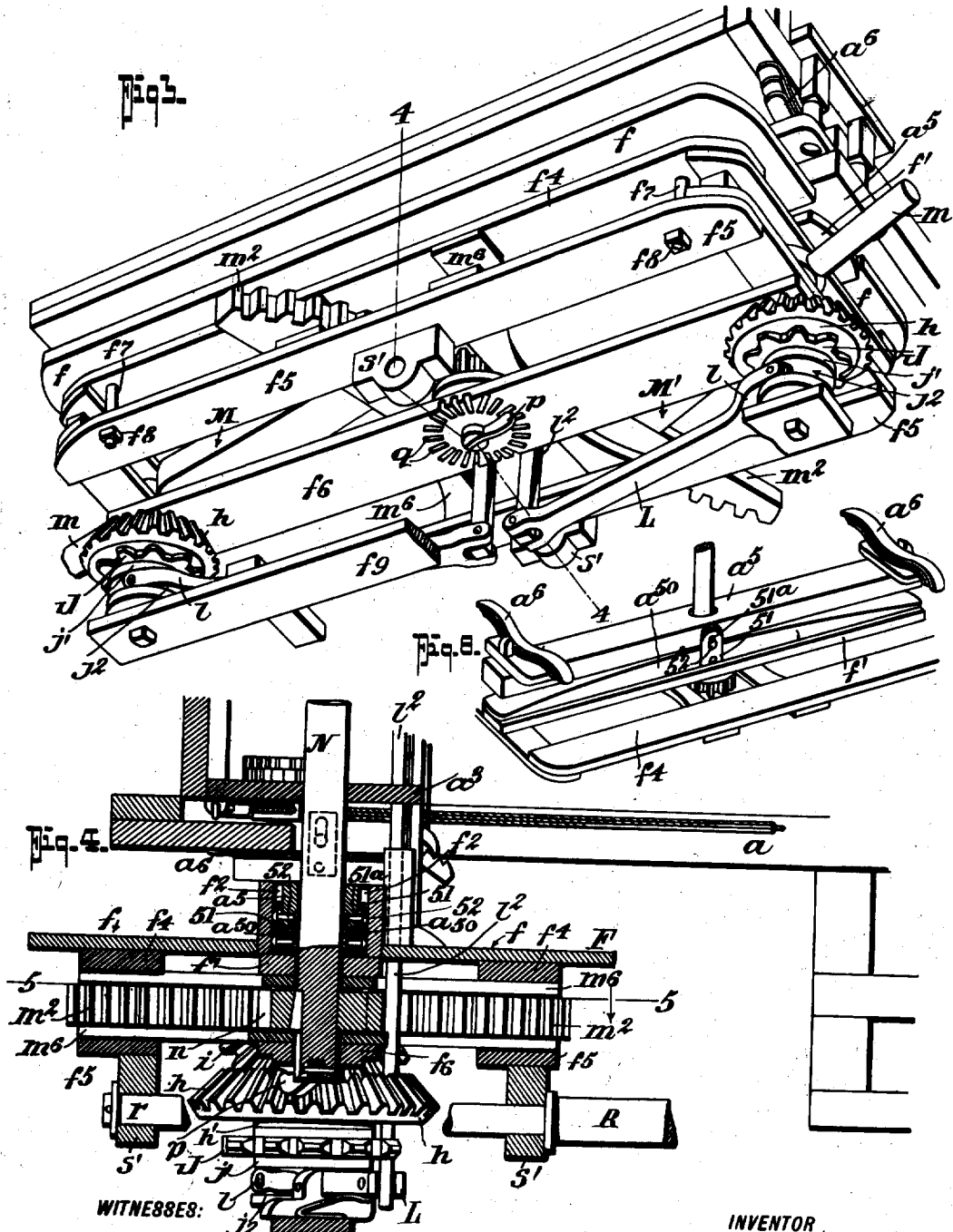

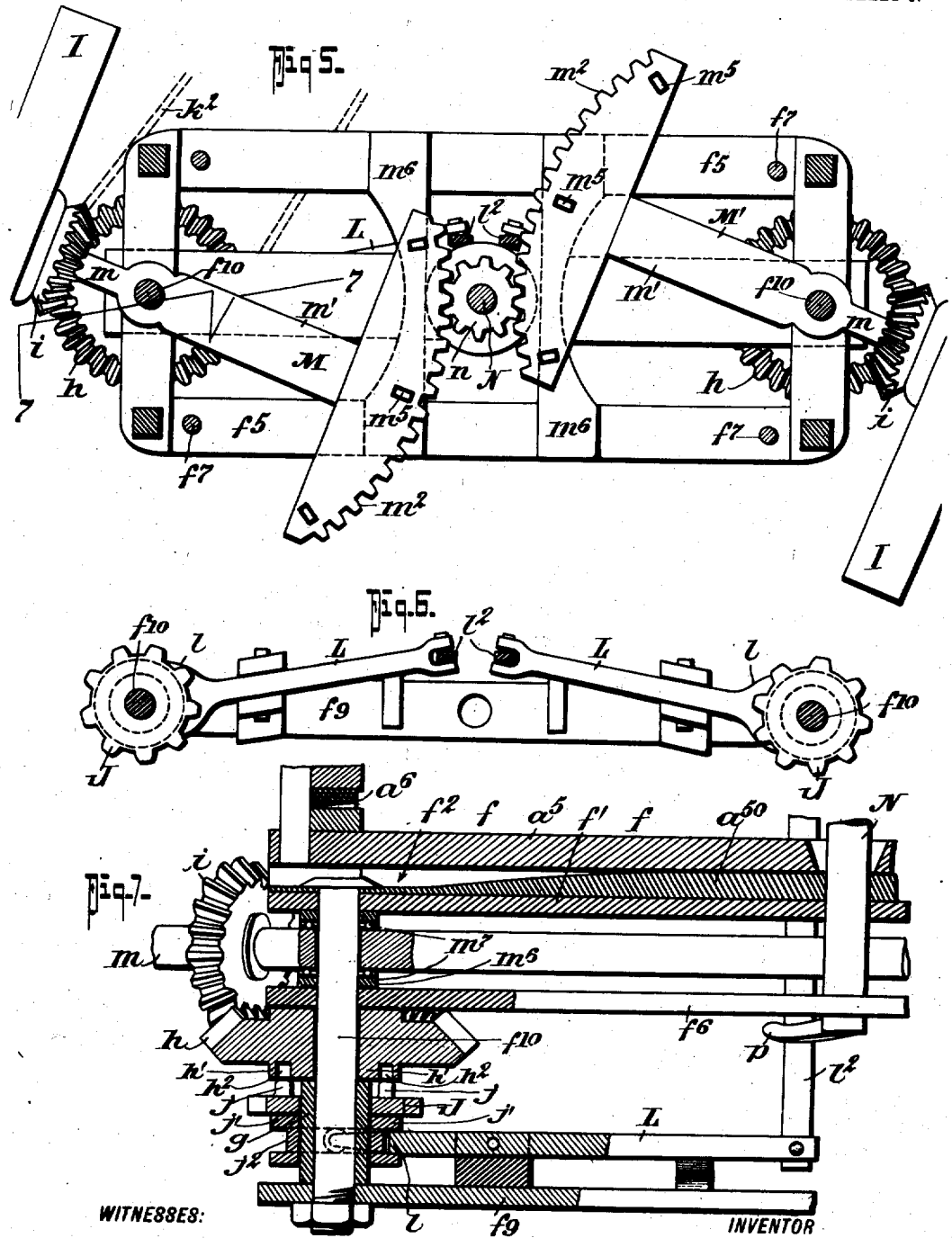

ROBERT HENRY BOWMAN, OF CANON CITY, COLORADO.

SHORT-TURN GEAR.

No. 897,450.        Specification of Letters Patent.        Patented Sept. 1, 1908.

Application filed February 24, 1908. Serial No. 417,380.

*To all whom it may concern:*

Be it known that I, ROBERT HENRY BOWMAN, residing at Canon City, in the county of Fremont and State of Colorado, have invented a new and Improved Short-Turn Gear, of which the following is a specification.

My present invention is in the nature of a short turn gear mechanism for vehicles, more particularly designed for motor vehicles, of that type disclosed in my copending application filed on March 11, 1908, Serial No. 420,486 and in which my short turn gear mechanism forms a coöperative part of the complete motor vehicle construction described and shown in the said application.

My present invention comprehends, generally an improved construction of short turn gear mechanism having the parts so designed whereby the truck wheels can be positively and quickly turned to the desired positions, in which each wheel has a separate drive means adapted to be thrown into or out of action at the will of the operator and in which the several lever actuated means are so disposed and adapted for such action that the operator can set them into or out of action by hand or foot power and to quickly lock the same to their adjusted positions.

In its more subordinate features my present invention consists in the peculiar and novel arrangement of parts and combination thereof all of which will be hereinafter fully described, specifically pointed out in the appended claims and illustrated in the accompanying drawings in which, Figure 1, is a perspective view of the front or dash board end of a motor vehicle equipped with my improved short turn gear mechanism, said view illustrating the correlative positions of the different lever mechanisms all under the control of a single operator for steering the gear mechanism and for actuating the transmission gear clutch and brake mechanisms. Fig. 2, is an inverted perspective view that illustrates the general arrangement of my short turn gear mechanism and the drive chain connections that join the same with the driven gears of a transmission mechanism. Fig. 3, is an inverted perspective view of the front end of the front truck frame with the short turn gear mechanism. Fig. 4, is a central vertical transverse section of the same taken on the line 4—4 on Fig. 3. Fig. 5, is a horizontal section thereof taken substantially on the line 5—5 on Fig. 4. Fig. 6, is a detailed plan view that illustrates the general arrangement of the levers L. Fig. 7, is a vertical section of the clutch mechanism that forms a part of my complete gear mechanism taken substantially on the line 7—7 on Fig. 5. Fig. 8, is a detail perspective view of the rockable connection for the upper and lower front bolster members hereinafter referred to.

In the practical application of my present invention the same is combined with a motor vehicle main frame in such manner that the short turn gear mechanism may be conveniently coupled with the drive or transmission gearing of the complete motor vehicle.

In the present case the short turn gearing is entirely mounted on the front truck in the manner generally disclosed in Fig. 2, which also shows enough of the motor vehicle main frame to locate driven gears $e$—$e$ that are actuated at times, through the will of the operator and which are coupled through chains with a pair of sprocket chain wheels J J on the vertical shafts or bolts $f^{10}$ that carry the bevel gears $h$, that mesh with and drive the bevel gears $i$ on the divided front axle members M, M¹ each of which carries one of the front truck wheels as shown.

The main frame of the motor vehicle includes a platform $a^3$ that is mounted on the side bars $a$—$a$ of the main frame, and which provides an ample support for the operator while controlling the steering and transmission gearing actuating levers, said lever mechanisms being clearly shown in Fig. 1 and hereinafter more fully referred to.

F designates a horizontally slotted subframe that is located under the main platform and in the longitudinal plane thereof. This sub-frame includes a bed portion $j$ formed with a central socket $f^2$ that extends its entire length and in which the upper bolster $a^5$ that is pendently secured to the upper or platform frame is rockably held and for such purpose the bottom of the socket $f^2$ is in the nature of a bottom bolster $a^{50}$ whose upper face is rounded in opposite directions from the center as is clearly shown in Fig. 8, by reference to which it will also be noticed that the upper bolster $a^5$ is rockably sustained on the lower bolster $a^{50}$ by the slotted straps or links 51 that are secured to the bottom bolster $a^{50}$ (see also Fig. 4), the bolts 52 that pass through the slots 51ᵃ on the links 51 serving to hold the upper bolster in place and at the same time allow the upper bolster to have a slight vertical play so as to avoid binding of the several parts while the front truck is passing over uneven ground.

To further provide for taking up the shock the side bars $a$—$a$ on the upper frame engage cushion or spring bearings $a^6$ that are mounted upon the outer ends of the bolster $a^5$ as clearly shown in Figs. 3 and 8.

By connecting the parts as described and in the manner shown, protects the steering post as it keeps the bolster $a^5$ in its proper place at all times and for bringing it back to its center when it rocks, the slotted ear connections also serving to keep the bolster $a^5$ from jumping out of place.

$f'$ designates another or lower bolster that coacts with bolster $a^5$ which also seats in the slotway $f^2$ in the bed frame portion $f$ and it is fixedly supported on a rectangular section $f^4$ of the subframe F, and the latter also includes a lower rectangular section $f^5$, that corresponds with the upper section $f^4$ and is held spaced apart therefrom but is made fast to it by the hanger bolts $f^7$ and nuts $f^8$ as clearly shown in Fig. 3.

$f^{10}$—$f^{10}$ designate hanger bolts or shafts that extend down through the end members of the two sections $f^4$ and $f^5$ that constitute the frame F and through a bottom bar $f^9$ that extends across the full length of the frame F, and the said bolts $f^{10}$—$f^{10}$ support the said bar $f^9$ and the wheel drive gearing and the clutch mechanisms that coöperate therewith.

In my construction of short turn gearing, each of the front truck wheels is mounted on an independent axle member and each has a drive mechanism also independently operated and each driven through a chain drive $k^2$ with the respective chain wheels J of the wheel drive devices.

Each of the wheel drive gearing or devices comprises a hub $g$ that is mounted on the corresponding hanger bolt $f^{10}$ at a point between the lower cross bar $f^9$ and a cross bar $f^6$ made fast to the end members of the lower section $f^5$ of the sub-frame F as best shown in Fig. 3, by reference to which it will be noticed bevel gears $h$—$h$ are loosely mounted on the said hubs $g$, that mesh with beveled gears $i$ on the hubs of the adjacent wheels I and the said gears $h$ are held to engage the wheel gears $i$ under all adjustments of the end wheels.

Each gear $h$ has a pendent hub $h'$ formed with a number of concentrically arranged clutch sockets $h^2$ for receiving the clutch lugs $j$ on the combined clutch and driving sprocket wheel J that receives motion through the endless chain $k^2$ that takes around the drive gear $e$, as before stated. Sprocket wheel J also has a pendent hub $j^2$ formed with an annular groove $j^3$ to receive the bifurcated end $l$ of the clutch lever L tiltably mounted on the bottom cross bar of the frame, see Fig. 7, and which extends toward the center of the truck frame and pivotally joins with an actuating rod $l^2$ that extends upwardly through the vehicle bed frame or platform and terminates in a handle $l^3$ for shifting the rod vertically, so as to lock the lever L to apply or release the clutch wheel J.

Each of the rods $l^2$ has a pawl $l^4$ that is released from the hand end that locks the said rod $l^2$ to a position for holding the clutch $j$ to its engaging position, the said rod $l^2$ also having a foot and engaged member $l^5$ for depressing it as clearly shown in Fig. 1.

By providing a clutch mechanism and combining with it a drive mechanism for each of the front wheels I, as shown and described, it follows, that either one or both of the said wheels may be readily thrown into or out of the gear with the power transmission gears $e$—$e$ driven in any approved manner, and the operation of controlling the run of the drive gears for the wheels quickly effected at the will of the operator.

Each wheel I, is mounted on a separate front axle section M M', and each of the said axle sections consists of a stub axle $m$ on which the wheels are loosely mounted and a flat portion $m^1$ that is held to oscillate in the horizontal plane between the upper and lower sections of the frame F and for such purpose the axles M M' are fulcrumed on the hanger bolts $f^{10}$ as shown. At the inner end, each axle section M M', has a segmental gear $m^2$ and the two opposing gears $m^2$ are arranged to mesh with a single gear $n$ mounted on the lower end of a steering post or rod N that extends upwardly through the bed or platform and carries at the upper end a suitable hand wheel as shown.

The steering rod N is normally locked from rotary movement so as to hold the axle members M and M' to their adjusted positions and such locking of the shaft is effected by a latch or pawl member $p$ pivotally mounted on the lower end of the rod N, see Fig. 3, and projects radially therefrom for engaging with any one of a series of radial notches or grooves $q$ on the under side of the cross bar $f^6$, the said pawl $p$ being also joined with the actuating rod $p^1$ that extends through the platform of the frame, and joins with a hand lever $p^2$ that is fulcrumed in the steering wheel shaft as clearly shown in the drawing.

The lever $p^2$ has a drop or latch member $p^3$ on its outer end that normally drops down to the position shown on Fig. 2, and it has shoulders $p^4$ so that when raised in line with the lever member $p^1$ it is locked to form a solid part of the lever $p^1$ and when thus adjusted, a lift pull on the member $p^3$ swings the lever $p^1$ upwardly and thereby raises the rod to bring the pawl $p$ on the lower end of the steering shaft N into a locked position for holding the said shaft from turning. To keep the steering post locked, the hand latch is hooked to the steering wheel. To reduce the friction, the mutilated or segmental gear members M M¹ have bearing rollers $m^5$ that work in slots therein and engage the segmental frame sections $m^6$ $m^6$ between which said gears $m^2$ and $m^2$ travel as clearly shown in Fig. 5, and for further reducing the friction between the several coöperating members, ball bearing washers $m^7$ are mounted on the flat faces of the axle members that are disposed concentrically about the fulcrum of the axles as clearly shown in Fig. 7.

R designates the reach bar for joining the front and rear truck frames, and which may be connected to the rear truck frame (not shown) in any approved manner. The front end $r$ of said bar is loosely journaled in pendent bearings $s^1$—$s^1$ on the front truck frame members $f^5$ as clearly shown in Figs. 3 and 4.

From the foregoing description taken in connection with the drawings the detailed construction and the general manner of operation of my invention will be readily understood.

It will be noticed that by arranging substantially the entire gear mechanism below the platform on which the operator stands, the action of the entire steering means is controllable through the manipulation of the main wheel O in the shaft N, and the levers L operated by the members $l^3$—$l^5$ and since these are located in close proximity to the main steering shaft N, ample room is left on the platform for the lever mechanisms that control the action of the transmission gearing for transmitting different speeds of motion. In Fig. 1, I have illustrated three sets of lever mechanisms designated 1—2—3, mechanisms 1 and 2 being used, for example, for controlling the normal and low speeds— mechanism No. 2 for controlling the high and full speeds of motion and mechanism No. 3 for throwing the entire transmission or drive gearing out of operative mesh with the engine or main drive shaft, it being understood that the said speed transmission gearing— the clutch and lever mechanism may be of any approved construction, preferably however, such as is disclosed in my copending application above referred to, since my present invention is a part of the complete motor vehicle mechanism shown in the said copending application.

By reason of the construction and arrangement of parts, it is manifest that should it be desired to throw out of gear with the drive mechanism either or both of the front wheels, the operator by first pulling up the rods $l^7$ to release latches $l^4$ and then pulling up the levers $l^2$—$l^2$ rocks the lever (or levers L,) and thereby moves the clutch sprocket wheel J out of engagement with the gear $h$ and leaves the wheel I with gears $i$ and $h$ to run loose (see Fig. 7).

To restore the clutched engagement of the clutch sprocket wheel J and gear $h$, it is only necessary for the operator to press down the levers $l^2$ by stepping on the lever member $l^5$, which brings the pawl $l^4$ to lock with ratchet port $l^5$ to hold the ports $j$ and $n$ locked together.

To steer the front truck, the operator manipulating the levers $p^2$ and $p^3$ to lower rod $p^1$ and disengage pawl $p$ from circular rack $q$ and turns wheel I as desired, which through gears $n$, $m^2$—$m^2$ transmits the desired motion to the two axle members M—M¹ and since the wheels loosely mounted therein are always in gear with gear $h$, during their movement in an arc about the shaft N, it follows that during the operation of turning rotation is still imparted to the wheels, it being understood that in making short turns, the pivot wheel is thrown out of gear with the drive mechanism.

Having thus described my invention, what I claim and desire to protect by Letters Patent is:—

1. In a short turn gear, the combination with the main frame of the vehicle, a pair of driven gears mounted thereon, and the front truck wheels loosely mounted on their respective axles; of a separate gear connection that joins each of the wheels with their respective drive gears, each of the said connections including a shifting clutch device, for throwing the wheels out of gear with their respective drive gears, means on the front truck frame for oscillating the wheels together but in reverse directions and other means on the said front truck frame for independently actuating the clutch devices.

2. A short turn gearing for motor vehicles, a pair of front truck wheels each loosely but independently mounted, means for oscillating the wheels in unison but in reverse directions, a pair of driven gears mounted on the vehicle frame, separate gear connections for joining the said drive gears with their respective front truck wheels and a separate means for each of said connections for throwing the wheels in or out of operable connection with their respective drive gears.

3. In a short turn gearing for motor vehicles, the main frame, a pair of independently acting drive gears mounted thereon, a pair of opposing axle sections fulcrumed on the front end of the frame to oscillate in the horizontal plane, means on the frame for oscillating the axles together but in reverse directions, a wheel loosely mounted on each axle having a hub gear, a clutch gear for each wheel hub gear, means on the front end of the frame for throwing either or both of said clutch gears into and out of operative connection with the hub gears, each of said clutch gears being coupled with one of the drive gears on the main frame.

4. In a short turn vehicle gear, the combination with vehicle framing, a centrally disposed steering post mounted therein having a gear at the lower end, of a pair of opposing axle sections, held to oscillate on the horizontal plane, fulcrum bolts therefor, each of the axle sections having segmental gear portions for meshing with the gear on the steering post, a wheel loosely mounted on each axle member having a hub gear, a gear loosely mounted on each of the fulcrum bolts, and drive gears mounted on the main frame coupled with the loose gears on the fulcrum bolts, and clutch devices for operatively connecting and disconnecting the loose gears with the drive gears.

5. In a short turn gear, in combination with the main frame, a pair of oppositely disposed horizontally mounted drive gears, and means on the main frame for transmitting motion to the pair of horizontally mounted drive gears, of a pair of axle members fulcrumed centrally of their respective horizontally drive gears, a wheel loosely mounted on each wheel section, having a hub gear in constant mesh with the horizontal gear, said axles each having a segmental member at the inner end, and a steering post mounted on the main frame centrally of the frame, a gear on the lower end of said post that meshes with the segmental gears on the axles and a means for locking the post to its rotatable adjustments a drive mechanism coupled with each horizontal drive gear and means for operatively connecting and disconnecting said drive mechanism from said horizontal drive gears as set forth.

ROBERT HENRY BOWMAN.

Witnesses:
J. T. CORWIN,
Mrs. H. R. McQUOWN